United States Patent
Bingham et al.

(10) Patent No.: US 6,198,747 B1
(45) Date of Patent: Mar. 6, 2001

(54) METHOD AND SYSTEM FOR ENHANCING COMMUNICATIONS EFFICIENCY IN DATA COMMUNICATIONS NETWORKS WHEREIN BROADCAST OCCURS

(75) Inventors: Brian N. Bingham, Apex; Jackie Jackson, Jr., Raleigh; Rosemary V. Slager, Cary; Deepak Vig, Raleigh; Charles A. Carriker, Cary; Cedell A. Alexander, Durham; John Kevin Frick, Raleigh; Edward J. Rovner, Chapel Hill; Matthew B. Squire, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/016,736

(22) Filed: Jan. 30, 1998

Related U.S. Application Data (60) Provisional application No. 60/036,610, filed on Jan. 30, 1997.

(51) Int. Cl.[7] .......................... H04L 12/28; H04L 12/56; H04J 3/16; H04J 3/22

(52) U.S. Cl. .......................... 370/401; 370/257; 370/396; 370/404; 370/469; 375/200.11; 375/200.13

(58) Field of Search .......................... 370/401, 404, 370/396, 469, 405, 395, 390, 398; 395/200.11, 200.13, 200.15, 200.5

(56) References Cited

U.S. PATENT DOCUMENTS

| | | | |
|---|---|---|---|
| 5,309,433 | 5/1994 | Cidon et al. | 370/60 |
| 5,325,357 | 6/1994 | Kimoto et al. | 370/60 |
| 5,361,256 | 11/1994 | Doeringer et al. | 370/60 |

(List continued on next page.)

FOREIGN PATENT DOCUMENTS

WO9414265    6/1994 (WO) .......................... H04L/12/56

OTHER PUBLICATIONS

IBM Technical Disclosure Bulletin, vol. 35, No. 2, Jul. 1992, Method for Universal MAC Frame Encoding.

IBM Technical Disclosure Bulletin, vol. 35, No. 2, Jul. 1992, Architecture for High Performance Transparent Bridges.

IBM Technical Disclosure Bulletin, vol. 37, No. 7, Jul. 1994, Intelligent Packet Relay in Distributed Multimedia Systems.

IBM Technical Disclosure Bulletin, vol. 38, No. 9, Jul. 1995, Algorithm for Multiport Source Routing to Transparent Bridging LAN Bridge.

International Technology Disclosures, vol. 11, No. 02, Feb. 1993, Optimal Mulicast Algorithm in Wormhole–Routed Mashes.

IBM Multiprotocol Switching Development Networking Hardware Division, Quick Guide to the IBM Multiprotocol Switched Services (MSS) Server Release 1.0, Cedell A. Alexander, Matthew B. Squire, Anthony B. O'Hare, C. Allen Carriker, John E. Dickey, J. Kevin Frick, Keith E. Karlsson, H. Lance Richardson, Ed J. Rovner, Timothy J. Smith and Niranjan S. Vaidya.

1996 Digital Communications Design Conference Implementing ATM Forum–compliant LAN Emulation, Bill Ellington and Cedell Alexander.

*Primary Examiner*—Huy D. Vu
*Assistant Examiner*—M. Phan
(74) *Attorney, Agent, or Firm*—John J. Timar; Felsman, Bradley, Gunter & Dillon (57) ABSTRACT

Provided are a method and system for use within at least one network wherein broadcast occurs. The method and system achieve their objects as follows. In response to reception of a data frame with at least one destination indicator ordinarily requiring broadcast to a first defined group of stations, at least one attribute of the received data frame is examined. In response to the step of examining, the received data frame is transmitted to a defined second group of stations, smaller in number than the first group of stations.

27 Claims, 9 Drawing Sheets

U.S. PATENT DOCUMENTS

| | | | |
|---|---|---|---|
| 5,394,397 | 2/1995 | Yanagi et al. | 370/60.1 |
| 5,400,326 | 3/1995 | Smith | 370/61 |
| 5,459,725 | 10/1995 | Bodner et al. | 370/60 |
| 5,519,704 | 5/1996 | Farinacci et al. | 370/85.13 |
| 5,541,915 | 7/1996 | Storm | 370/60.1 |
| 5,541,927 | 7/1996 | Kristol et al. | 370/94.2 |
| 5,600,644 * | 2/1997 | Chang et al. | 370/404 |
| 5,734,824 * | 3/1998 | Choi | 395/200.11 |
| 5,805,805 * | 9/1998 | Civanar et al. | 395/200.5 |
| 5,812,552 * | 9/1998 | Arora et al. | 370/401 |
| 5,835,481 * | 11/1998 | Akyol et al. | 370/216 |

* cited by examiner

Fig. 11

METHOD AND SYSTEM FOR ENHANCING COMMUNICATIONS EFFICIENCY IN DATA COMMUNICATIONS NETWORKS WHEREIN BROADCAST OCCURS

CROSS-REFERENCE TO RELATED PATENT APPLICATIONS

The present invention is related to the subject matter of the provisional United States Patent Application entitled "Broadcast Management Within an Asynchronous Transfer Mode LAN Emulation," filed Jan. 30, 1997, Ser. No. 60/036,610 (IBM Docket No. RA9-97-008P), assigned to the assignee herein named. Applicants hereby claim the benefit under 35 U.S.C. § 119(e) of this foregoing related provisional application. The contents of the above-mentioned provisional patent application is incorporated by reference herein.

BACKGROUND OF THE INVENTION

1. Technical Field

The present invention is related to a method and system to be utilized in data communications. In particular, the present invention is related to a method and system to be utilized in data communications involving at least one data communications network. Yet still more particularly, the present invention is related to a method and system, to be utilized in data communications involving at least one data communications network wherein broadcast occurs.

2. Description of the Related Art

Data communications is the transfer of data from one or more sources to one or more sinks that is accomplished (a) via one or more data links between the one or more sources and one or more sinks and (b) according to a protocol. Weik, *Communications Standard Dictionary* 203 (3rd ed. 1996). A data link is the means of connecting facilities or equipment at one location to facilities or equipment at another location for the purpose of transmitting and receiving data. Weik, *Communication Standard Dictionary* 206 (3rd ed. 1996). A protocol, in communications, computer, data processing, and control systems, is a set of formal conventions that govern the format and control the interactions between two communicating functional elements in order to achieve efficient and understandable communications. Weik, *Communications Standard Dictionary* 770 (3rd ed. 1996).

A data communications network is the interconnection of three or more communicating entities (i.e., data sources and/or sinks) over one or more data links. Weik, *Communications Standard Dictionary* 618 (3rd ed. 1996).

Data communications networks connect and allow communications between multiple data sources and sinks over one or more data links. The concept of a data link includes the media connecting one or more data sources to one or more data sinks, as well as the data communications equipment utilizing the media. The data communications networks utilize protocols to control the interactions between data sources and sinks communicating over the one or more data links. Thus, it follows that such protocols must take into account the data communications requirements of data sources and links desiring communication over the one or more data links, and the nature of the underlying one or more data links themselves, in order to ensure that the requirements of such data sources and sinks are met.

Of necessity, data communication protocols must take into account both the technology of the underlying data links and the data source and sink communications requirements. The underlying data links, data source, and data sink communications requirements give rise to a high degree of complexity.

It has been found that the complexity can be reduced to a manageable level by modularizing the concepts of data communication network protocols. One such well-known modular approach is the OSI 7 layer (or level) model. While the OSI model does have seven layers, the first, second, and third levels will be most relevant to the detailed description to follow.

OSI Level 1 is the physical level, and deals with the true electrical signals and electrical circuits that are utilized to carry information. OSI Level 2 is known as the service layer interface and is a conceptual level whereby access to the physical level (OSI Level 1) is actually controlled and coordinated. A good example of OSI Level 2 is LAN protocol, which coordinates and controls access to the physical layer (OSI Level 1), or media over which actual transmission occurs, by use of data frames (packages of binary data) to which are appended headers containing a source address and a destination address. In LAN terminology, these addresses are referred to as media access control (MAC) addresses.

OSI Level 2 deals with access and control of actual media over which data is transmitted. Physical constraints often put an upper limit on the number of stations that can be physically connected (at OSI Level 1). OSI Level 2 defines ways that multiple discontinuous OSI Level 1, or physical, segments can be stitched together to achieve what appears to be one large coherent (or contiguous) network. The OSI Level 2 achieves this by managing "bridges" between physical segments. In Ethernet LAN, these bridges are termed transparent bridges, and in token-ring LAN these bridges are termed source route bridges.

Conceptually one step removed from OSI Level 2 is OSI Level 3, the network layer. Network designers prefer to work with one large network, with a defined number of homogeneous network addresses. Consequently, OSI Level 3 has been developed. OSI Level 3 allows network designers to treat what may, in fact, be a tremendously large number of non-contiguous network segments strung together by OSI Level 2 entities as one large homogenous network. That is, OSI Level 3 allows network designers to refer to one network level protocol defined set of addresses. OSI Level 3 entities then pass such defined network addresses down to OSI Level 2 entities, which actually figure out where such network addresses are to be located on a true physical network.

OSI Level 2 entities typically achieve this by "mapping" the OSI Level 3 network addresses onto OSI Level 2 service layer addresses. Thus, when an OSI Level 3 entity passes a network layer address to an OSI Level 2 entity, the OSI Level 2 typically uses a look-up table to convert the OSI Level 3 address into its OSI Level 2 equivalent.

Due to the fact that what appears, from an OSI Level 3 standpoint, to be one large contiguous network, can in fact by many smaller non-contiguous networks stitched together by OSI Level 2 entities, it sometimes happens that an OSI Level 3 address is passed down to an OSI Level 2 entity which does not recognize the OSI Level 3 address. That is, there is no known mapping from the OSI Level 3 address to the OSI Level 2 address.

When this occurs, the typical response of the OSI Level 2 entity is to engage in "broadcast." Broadcast merely means that the OSI Level 2 entity transmits to every other OSI Level 2 entities with whom it can communicate, and essentially asks if any of those stations support the OSI Level 3 address which is unknown to the OSI Level 2 broadcasting entity. Any such OSI Level 2 entity supporting the OSI Level 3 address can then answer back, and support of the OSI Level 3 address be thereby established.

When a broadcast occurs, it in effect forces every OSI Level 2 entity, and every OSI Level 3 entity attached to the OSI Level 2 entities, who can hear the OSI Level 2 entity to interrupt what they are doing and determine whether or not they support the OSI Level 3 address in question. For those stations which do not support the address, such interruptions are needless.

In addition, every time that a broadcast message encounters a bridge, the broadcast is retransmitted onto the physical segments which are bridged. Such retransmission loads the network and again interrupts the OSI Level 2 entities connected to the bridged physical segments.

New (non-OSI) types of network protocols (such as Asynchronous Transfer Mode, or ATM) have emerged that do not, in their native form, support the standard well-developed OSI EnLevel 2 and 3 protocols. However, due to the tremendous installed base of OSI-type networks (e.g., Wide Area Networks (WANs), Local Area Networks (LANs), Internet Protocol Networks), such non-OSI networks have been forced to provide emulation of OSI-type networks. In a manner that will become more apparent in the detailed description, broadcast is particularly troublesome in such emulated network environments and causes significant network loading.

It is therefore apparent that a need exists for a method and system, to be utilized in data communications involving at least one data communications network wherein broadcast occurs, which decrease network loading.

SUMMARY OF THE INVENTION

It is therefore one object of the present invention to provide a method and system to be utilized in data communications.

It is therefore another object of the present invention to provide a method and system to be utilized in data communications involving at least one data communications network.

It is yet still another object of the present invention to provide a method and system, to be utilized in data communications involving at least one data communications network wherein broadcast occurs, which decrease network loading.

The foregoing objects are achieved as is now described.

Provided are a method and system for use within at least one network wherein broadcast occurs. The method and system achieve their objects as follows. In response to reception of a data frame with at least one destination indicator ordinarily requiring broadcast to a first defined group of stations, at least one attribute of the received data frame is examined. In response to the step of examining, the received data frame is transmitted to a defined second group of stations, smaller in number than the first group of stations.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The following involves discussion of specific ATM protocols known in the art. Those skilled in the art will recognize that any specific discussion of ATM networks necessarily requires use of a number of acronyms and ATM specific concepts. Following, brief descriptions of acronyms utilized will be given. Those requiring more detailed descriptions of the acronyms are referred to the ATM references well known to those within the art. In addition, useful and necessary information is set forth by Dr. Cedell Alexander and Mr. Bill Ellington in the research paper *Implementing ATM Forum-compliant ATM Emulation*, Proceedings of Design SuperCon '96 pages 5.1–5.19 (EE Times 1996), which is incorporated by reference herein in its entirety.

The following presents a detailed description of an illustrative embodiment of the proposed method and system to be utilized with Local Area Network Emulation systems. Those skilled in the art will recognize that an illustrative embodiment of the present invention will function in any environment wherein a base data communications network is overlaid with any system which makes the base network appear and function as if the base network were in fact running protocols and providing functions different from those which the base network in actuality is running and providing. The following described illustrative embodiments are set forth to illustrate the concepts and principles involved in such functioning.

In the following detailed description, like parts are indicated by like numbers. Furthermore, the first digit of each reference numeral generally relates to the figure wherein the primary description of that reference numeral appears. For example, 1xx would have its primary description in relation to FIG. 1, 2xx in relation to FIG. 2, 3xx in relation to FIG. 3, and so forth.

There are different ways of running network layer protocols across an (overlay mode) ATM network, but one of the most popular is known as LAN Emulation (LANE). The LANE designation applies to a specific protocol by which local area networks are emulated, but those skilled in the art will recognize that LANE is representative of all emulation schemes which "overlay" one protocol scheme (e.g., a Local Area Network protocol) on top of a network running a different protocol scheme (e.g., an ATM protocol).

As the name suggests, the function of the LANE protocol is to emulate a local area network on top of an ATM network. The LANE protocol defines mechanisms for emulating well known LANs such as Ethernet and Token Ring LANs.

What LAN Emulation means is that the LANE protocol defines a service interface for higher layer (that is, network layer) protocols, which is identical to that of existing LANs, and that data sent across the ATM networks are encapsulated in the appropriate LAN MAC (medium access control) packet format. It does not mean that any attempt is made to emulate the actual media access control protocol of the specific LAN concerned (that is, CSMA/CD for Ethernet or token passing for Token Ring LANs).

In other words, the LANE protocols make an ATM network look and behave like an Ethernet or Token Ring LAN.

The rationale for doing this is that it requires no modifications to higher layer protocols to enable their operation over an ATM network. Since the LANE service presents the same service interface of existing MAC protocols to network layer software, no changes are required in such software.

The LANE protocol defines the operation of a single emulated LAN (ELAN). Multiple ELANs may coexist simultaneously on a single ATM network since ATM connections do not "collide." A single ELAN emulates either Ethernet or Token Ring. A single ELAN is composed of a LAN Emulation Server/Broadcast and Unknown Server (LES/BUS), and LAN Emulation Clients (LE Clients) of that LES/BUS.

As has been discussed, LANE allows machines running Local Area Network protocols to interface with and utilize ATM protocol networks via the network layer commands of the Local Area Network protocols. How this is accomplished will be illustrated below.

Figure 1:
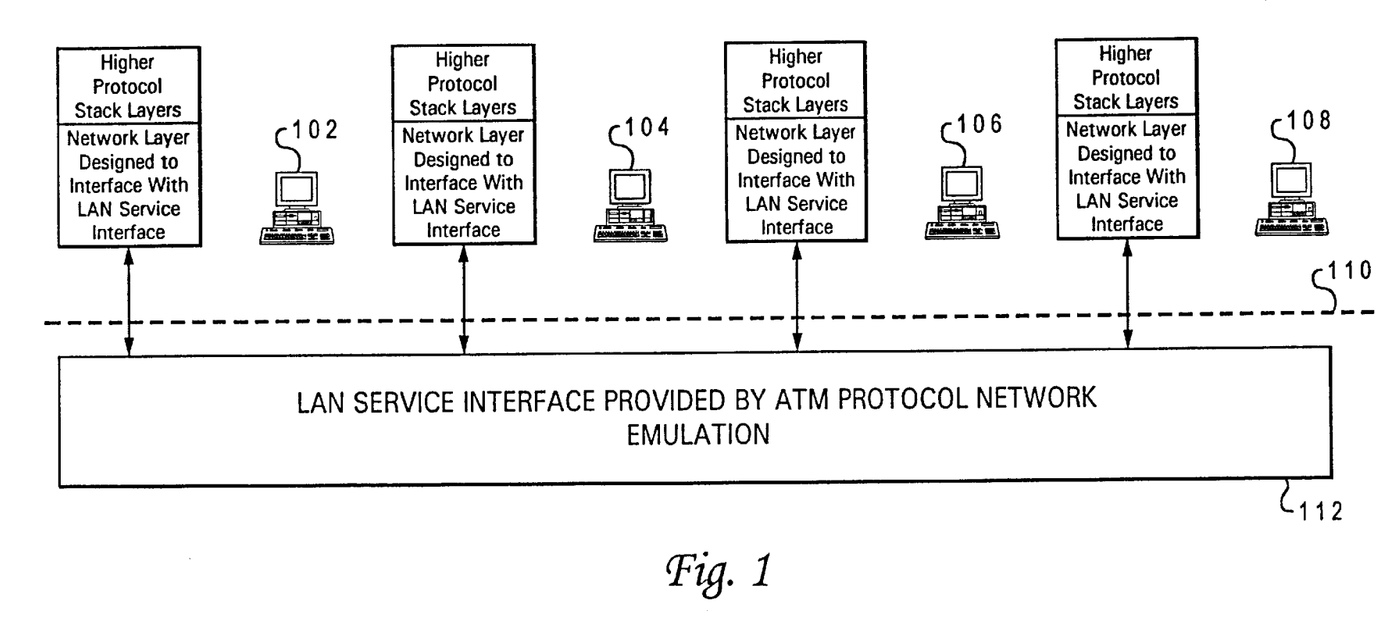
FIG. 1 illustrates how ATM protocol network LANE appears from the standpoint of computers utilizing such Local Area Network Emulation.

FIG. 1 illustrates how ATM protocol network LANE appears from the standpoint of computers utilizing such Local Area Network Emulation. It is assumed for sake of illustration that computers 102, 104, 106, and 108 are running some protocol stack with a network layer set up to interface a with a standard Local Area Network protocol (such as Token Ring or Ethernet). In a normal, physical, Local Area Network, the network layer of a computer utilizing the Local Area Network communicates with other stations on the Local Area Network by presenting the Local Area Network address or addresses of the computers on the Local Area Network to the service interface provided by the local area network itself. The stations on the local area network are typically identified by Media Access Control (MAC) addresses, and thus the network layer indicates which one or more stations are to be contacted by presenting MAC addresses at this interface.

As is shown in FIG. 1, with LANE the operation is exactly the same. That is, computers 102, 104, 106, and 108 continue to run some protocol designed to interface with standard Local Area Network protocols. When one of computers 102, 104, 106, or 108 desires to communicate to one or more other computers it hands a MAC address into the ATM protocol network emulation service interface 112 "as if" that interface were the service interface of a standard local area network protocol. Subsequently, the ATM protocol network emulation service interface 112 responds in the same way as the service interface of whatever LAN is being emulated. Thus, from the standpoint of applications programs running on attached computers 102, 104, 106, and 108, the fact that an emulation is present is completely transparent. Thus, such ATM protocol network emulation allows higher layer application protocols to continue to be utilized with no modification.

Where the unmodified applications end and the ATM protocol network emulation begins is illustrated in FIG. 1 by ATM protocol network emulation demarcation 110 (the dashed line separating computers 102, 104, 106, and 108 (running some LAN compatible protocol on the network layer) from the ATM protocol network emulation of a standard LAN service interface (e.g., media access control layers of some standard local area network protocol)).

Figure 2:
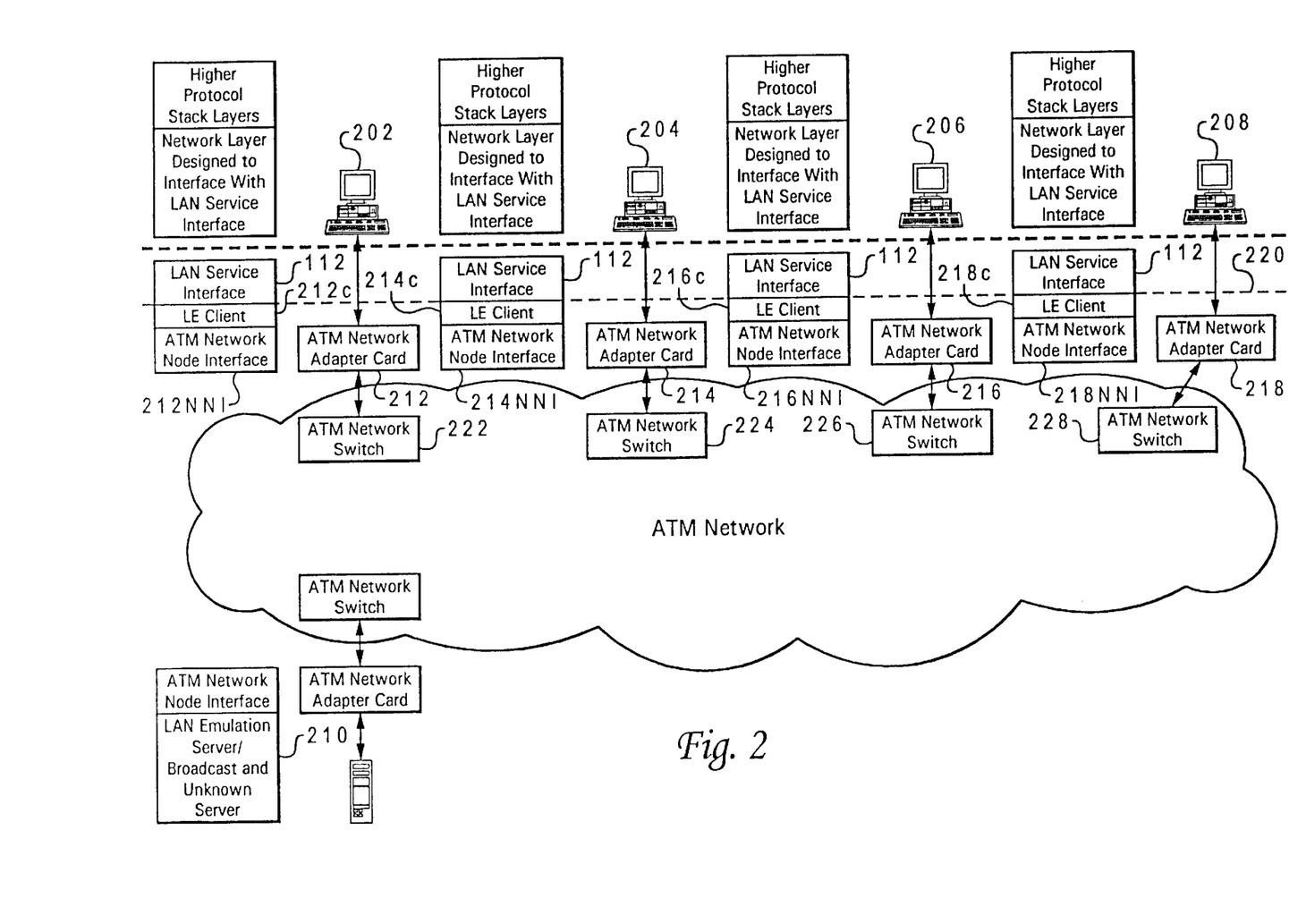
FIG. 2 gives an illustration of how ATM protocol provides Local Area Network Emulation.

FIG. 2 gives an illustration of how ATM protocol provides Local Area Network Emulation. As will be shown in FIG. 2, ATM protocol provides Local Area Network Emulation by essentially doing two things: (1) slightly modifying the hardware and software of computing systems to be attached to an ATM network such that the computing systems can physically attach to and communicate with an ATM protocol network; and (2) providing hardware and software within the ATM protocol network itself which functions in conjunction with the modified attached computing systems to give rise to the appropriate emulation.

With respect to illustrating the modifications of the hardware of computing systems to be attached to the ATM network, shown in FIG. 2 are computers 202, 204, 206, and 208 to which are connected to ATM Network Adapter Cards 212, 214, 216, and 218, which are in turn connected (usually via fiber optic links) to ATM Network Switches 222, 224, 226, and 228. Such modifications allow computers 202, 204, 206, and 208 to physically attach to and physically exchange signals with ATM Network Switches 222, 224, 226, and 228 which are actually part of the ATM protocol network proper.

With respect to illustrating the modifications of the software of computing systems to be attached to an ATM network, shown in FIG. 2 are computers 202, 204, 206, and 208 in which is illustrated the existence of ATM protocol network emulation service interface 112, which interfaces with LE Clients 212C, 214C, 216C, and 218C. LE Clients 212C, 214C, 216C, and 218C interface with ATM Network Node Interfaces 212NNI, 214NNI, 216NNI, and 218NNI. ATM Network Node Interfaces 212NNI, 214NNI, 216NNI, and 218NNI provide the mechanism by which LE Clients 212C, 214C, 216C, and 218C communicate by and through ATM Network Adapter Cards 212, 214, 216, and 218 with ATM Network Switches 222, 224, 226, and 228.

LE Clients 212C, 214C, 216C, and 218C are under the control of LES/BUS 210. Such LE Client under the control of LES/BUS 210 constitute an ELAN proper; accordingly, shown in FIG. 2 is line 220 demarking the boundary of the ELAN shown, which is composed of the LE Client 212C, 214C, 216C, and 218C under the control of LES/BUS 210.

When an application program running on computer 202 desires to communicate with another application running on another computer attached to the ELAN demarcated by line 220, computer 202 specifies the MAC address of that other computer and passes it to ATM protocol network emulation service interface 112. Subsequently, ATM protocol network emulation service interface 112 passes the MAC address to LE Client 212C. LE Client 212C determines, from the received MAC address, what LAN function is to be emulated (e.g., that communication with a computer on the emulated LAN is to be established).

Subsequently, LE Client 212C via ATM protocol, queries LES 210 as to the ATM address of the device wherein the computer identified by the MAC address is located. This operation is known in the art as LAN Emulation Address Resolution Protocol (LE_ARP) Request.

In response to the LE_ARP Request, LES 210 consults its look up table (those in the art will recognize that a look up table is just one of the ways in which such could be accomplished) and responds with the ATM protocol network address wherein the LE Client associated with the MAC address resides. This operation is known in the art as LE_ARP Response.

Subsequent to receiving the ATM protocol address, LE Client 212C encapsulates the data utilizing appropriate ATM protocol and sends it to the correct LE Client associated with the MAC address. The receiving LE Client, upon receipt of such data, then strips off the ATM protocol and delivers the data to the destination computer, through ATM protocol network emulation service interface 112, in standard local area network protocol format. Subsequent ELAN communications proceed in much the same logical fashion. Thus, insofar as higher level applications running on computers 202, 204, 206, and 208 are concerned, they are connected into a standard service interface of a standard Local Area Network, and the fact that the underlying network is in fact an ATM protocol network is completely transparent, and hence of no consequence, to applications of computers 202, 204, 206, and 208 utilizing the emulated LAN.

Figure 3:
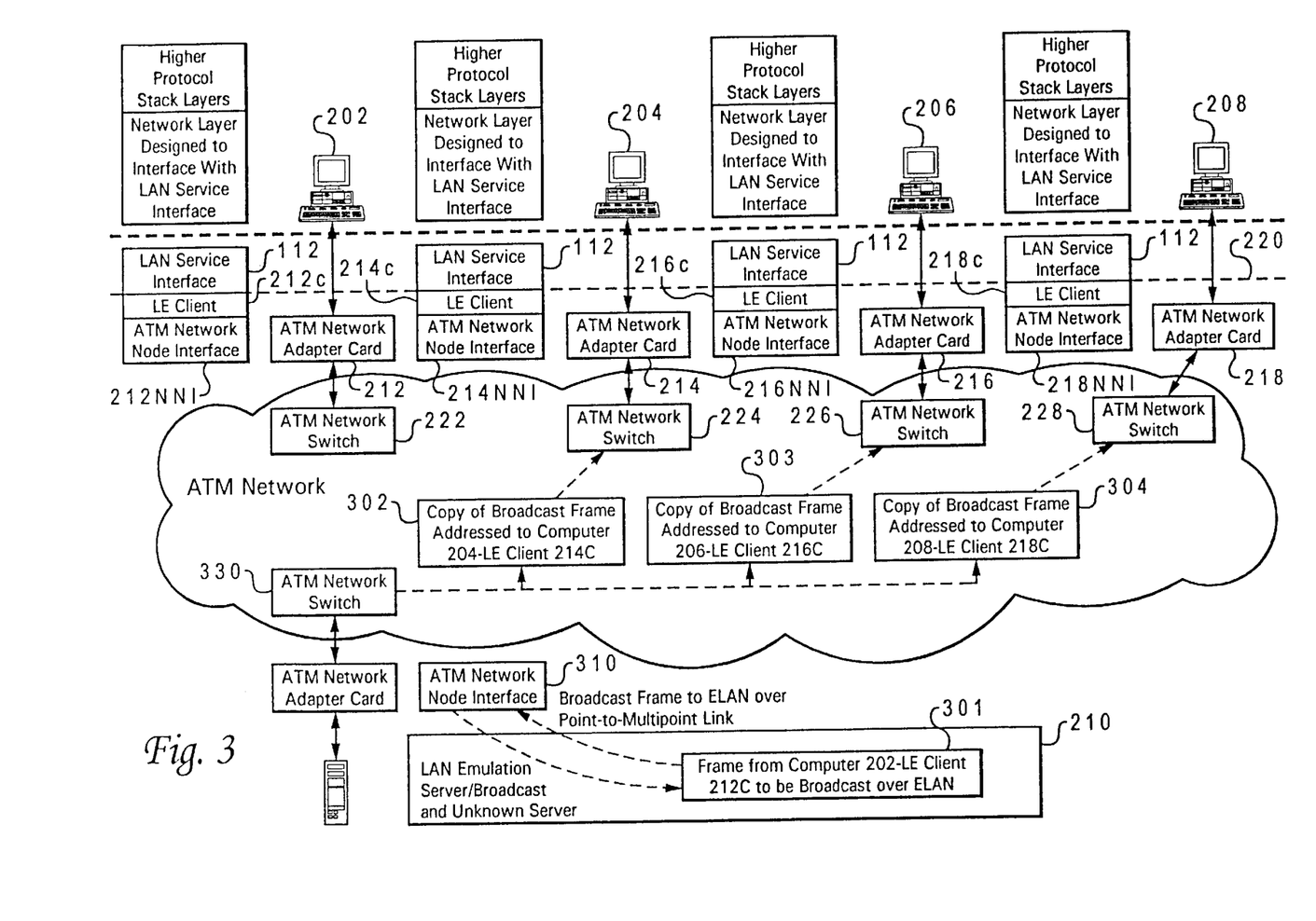
FIG. 3 gives a conceptual illustration of how the ATM protocol network provides Local Area Network broadcast emulation.

It was set forth above that when an ELAN is to provide emulation of a broadcast function of a physical LAN, network efficiency may be decreased due to the monopolization of network resources by one or more devices over-utilizing the broadcast function emulation. FIG. 3 will be used to illustrate how this can occur.

FIG. 3 gives a conceptual illustration of how the ATM protocol network provides Local Area Network broadcast emulation. In FIG. 3, parts with 100 and 200 series reference numerals function substantially the same as parts with those same reference numerals set forth in FIG. 1 and FIG. 2.

When computer 202 desires to broadcast to another computer on ELAN 220, computer 202 specifies the MAC address correspondent to "broadcast" and passes such broadcast address to ATM protocol network emulation service interface 112. Subsequently, ATM protocol network emulation service interface 112 passes the data with the MAC address to LE Client 212C. LE Client 212C then, via ATM protocol, sends the data with the MAC address to LES/BUS 210. Upon receipt of the data with the MAC address (shown in FIG. 3 as Frame from computer 202-LE Client 212C to be Broadcast over ELAN 301), LES/BUS 210 examines the MAC address and determines such corresponds to a LAN broadcast function.

As shown in FIG. 3, in response to such determination, LES/BUS 210 sends a request, through ATM Network Node Interface 31ONNI, to ATM Network Switch 330 for ATM Network Switch 330 to broadcast the frame to the ELAN over a point-to-multipoint link.

In response to such request, shown is that ATM Network Switch 330 duplicates the frame (those skilled in the art will appreciate that the information in the frame is duplicated rather than the frame itself) and addresses such copies to all LE Clients composing ELAN 220. Such copies are shown in FIG. 3 as Copy of Broadcast Frame Addressed to Computer 204-LE Client 214C 302, Copy of Broadcast Frame Addressed to Computer 206-LE Client 216C 303, and Copy of Broadcast Frame Addressed to Computer 208-LE Client 218C 304.

As shown in FIG. 3, once these copies are prepared and addressed, they are the transmitted through the ATM protocol network to the stations on the ELAN. Thus, the foregoing clearly demonstrates how the ELAN LES/BUS combination provides "broadcast" emulation.

Notice that the foregoing scheme of broadcast emulation basically multiplies the original transmission to be "broadcast" by at least a factor of how many other LE-Clients compose the ELAN. Add to this the required processing for the ATM Network Switch to duplicate the data and readdress it. From this, it can be seen that one or more computers utilizing the ELAN could easily monopolize the system and subsequently greatly disrupt data flow should such a station continually transmit broadcast requests.

Furthermore, examination of FIG. 3 will make clear that if the number of LE Clients composing the ELAN were much larger (e.g., two thousand LE Clients) then the sheer number of stations on the ELAN would make each "broadcast" emulation very expensive from both a computational and bandwidth perspective. Thus, in such a situation it would take many less successive "broadcast" requests from a particular LE Client or computer using an ELAN to overload or monopolize the system. As will be shown below, the present invention will alleviate the foregoing and other analogous problems.

Figure 4:
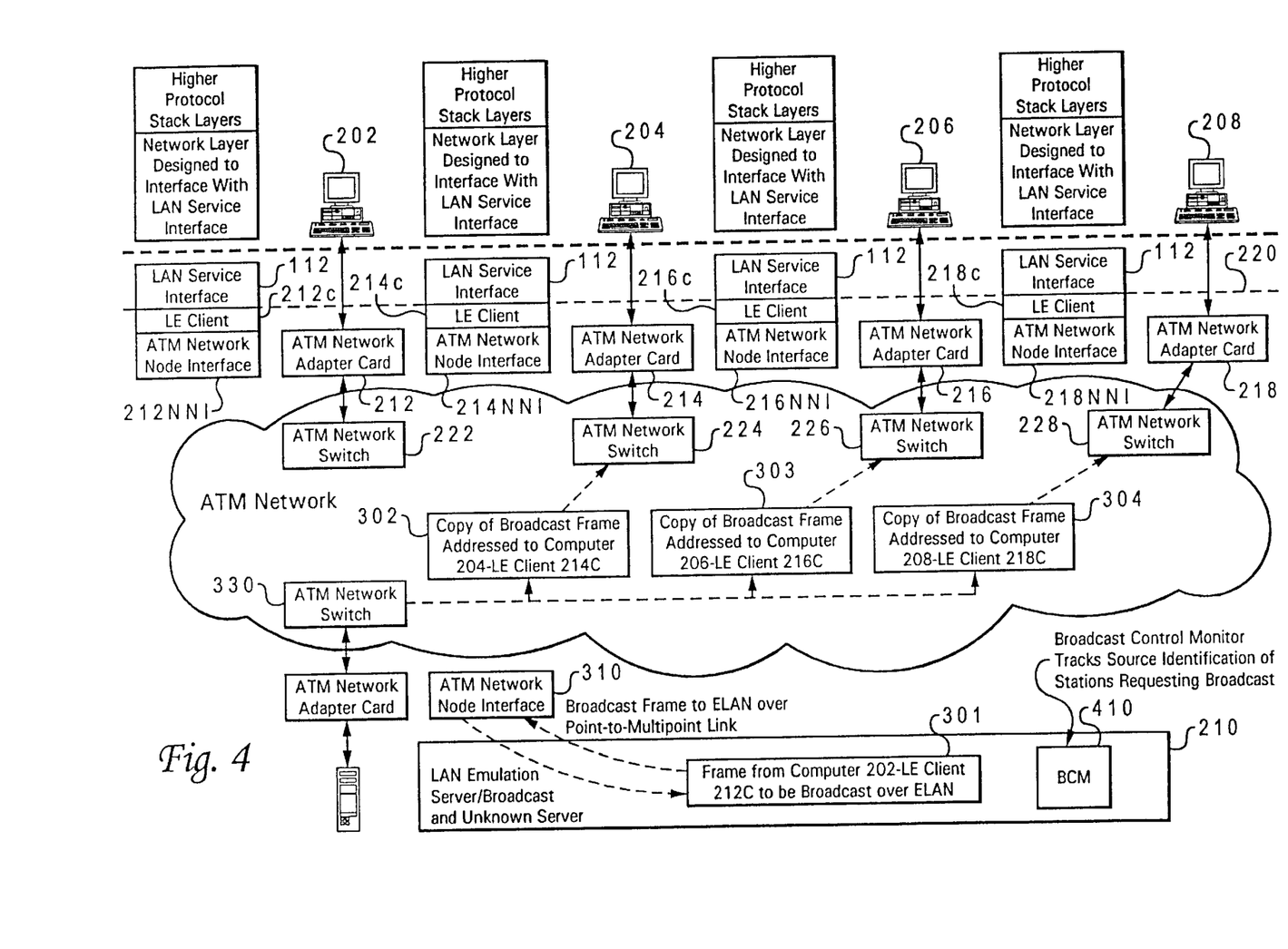
FIG. 4 is a partially schematic diagram which illustrates concepts whereby one illustrative embodiment of the present invention alleviates the problems arising from one or more devices monopolizing the resources of an emulated network.

FIG. 4 is a partially schematic diagram which illustrates concepts whereby one illustrative embodiment of the present invention alleviates the problems arising from one or more devices monopolizing the resources of an emulated network. The partially schematic diagram of FIG. 4 is identical in operation in most respects with the partially schematic diagram shown in FIG. 3, with the exception that FIG. 4 has included within LES/BUS 210 a BroadCast Manager (BCM) 410. In operation BCM 410 monitors the traffic transiting LES/BUS 210, and insures that LES/BUS 210 makes efficient use of network resources, as described in relation to FIGS. 5, 6, and 7, below. However, although BCM 410 is shown in FIG. 4 as a component of BUS 210, it will be understood in the art that BCM could just as easily be made a component of LES 310, or could be interposed as a stand alone entity between LES 310 and BUS 330.

In one embodiment of the present invention, with respect to the environment described in FIGS. 1–4, BCM 410 increases bandwidth efficiency via insuring that any "broadcasts" sent by LAN Emulation Server/Broadcast and Unknown Server 210, in response to the request for services, are only sent to those LE Clients, within a defined ELAN, wherein reside applications compatible with the native (OSI Level 3) protocol of the entity making the request for services. In order to achieve such efficient bandwidth utilization, it is necessary for BCM 410 to be able to create, and to have access to, lists of ATM network entities wherein reside applications compatible with specific native (OSI Level 3) protocols. BCM 410 utilizes such lists to insure that any "broadcasts," sent by LAN Emulation Server/Broadcast and Unknown Server 210, are sent in the most efficient manner possible.

Figure 5:
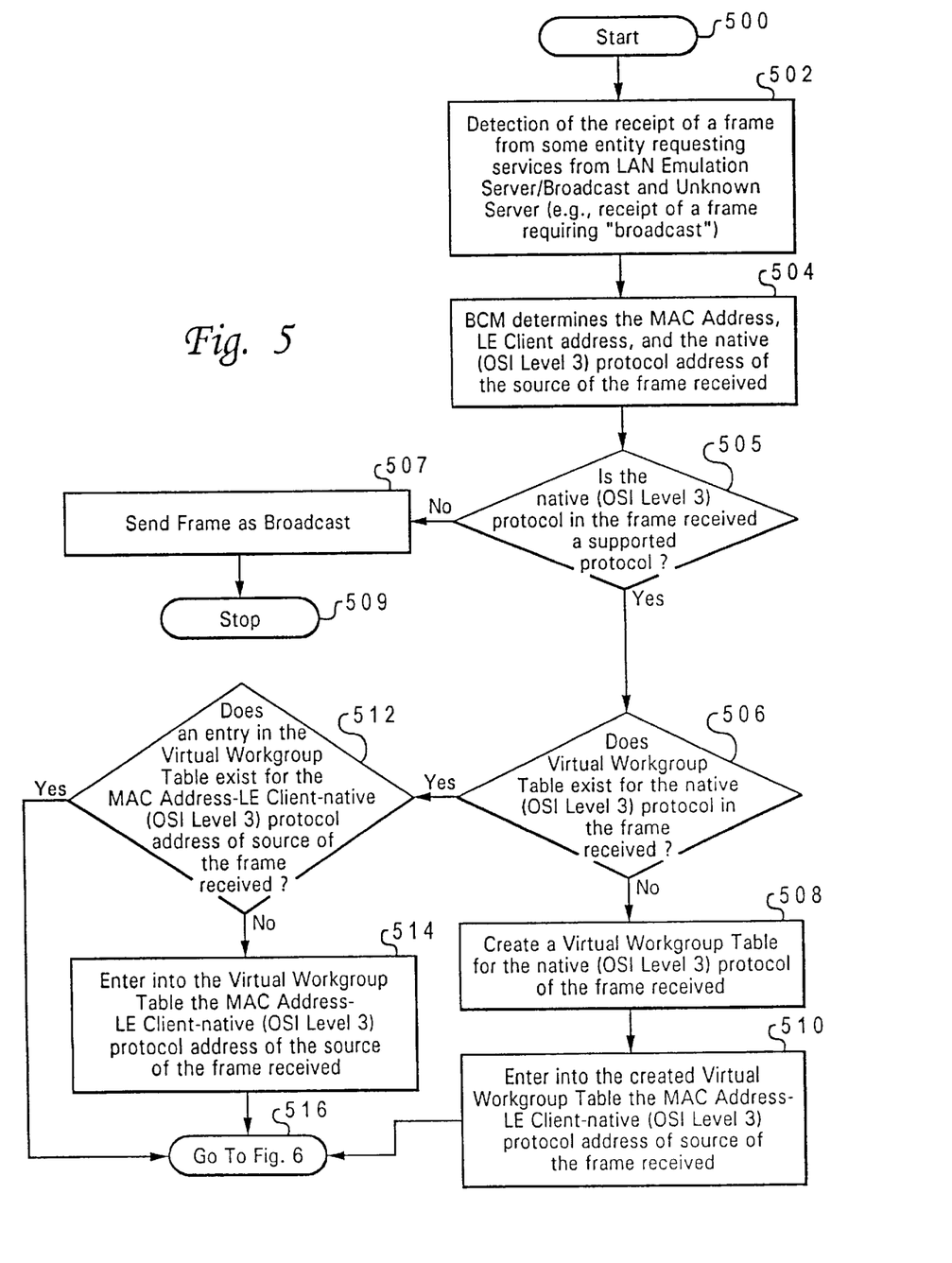
FIG. 5 depicts how such Virtual Workgroup Tables are created and maintained.
Figure 6:
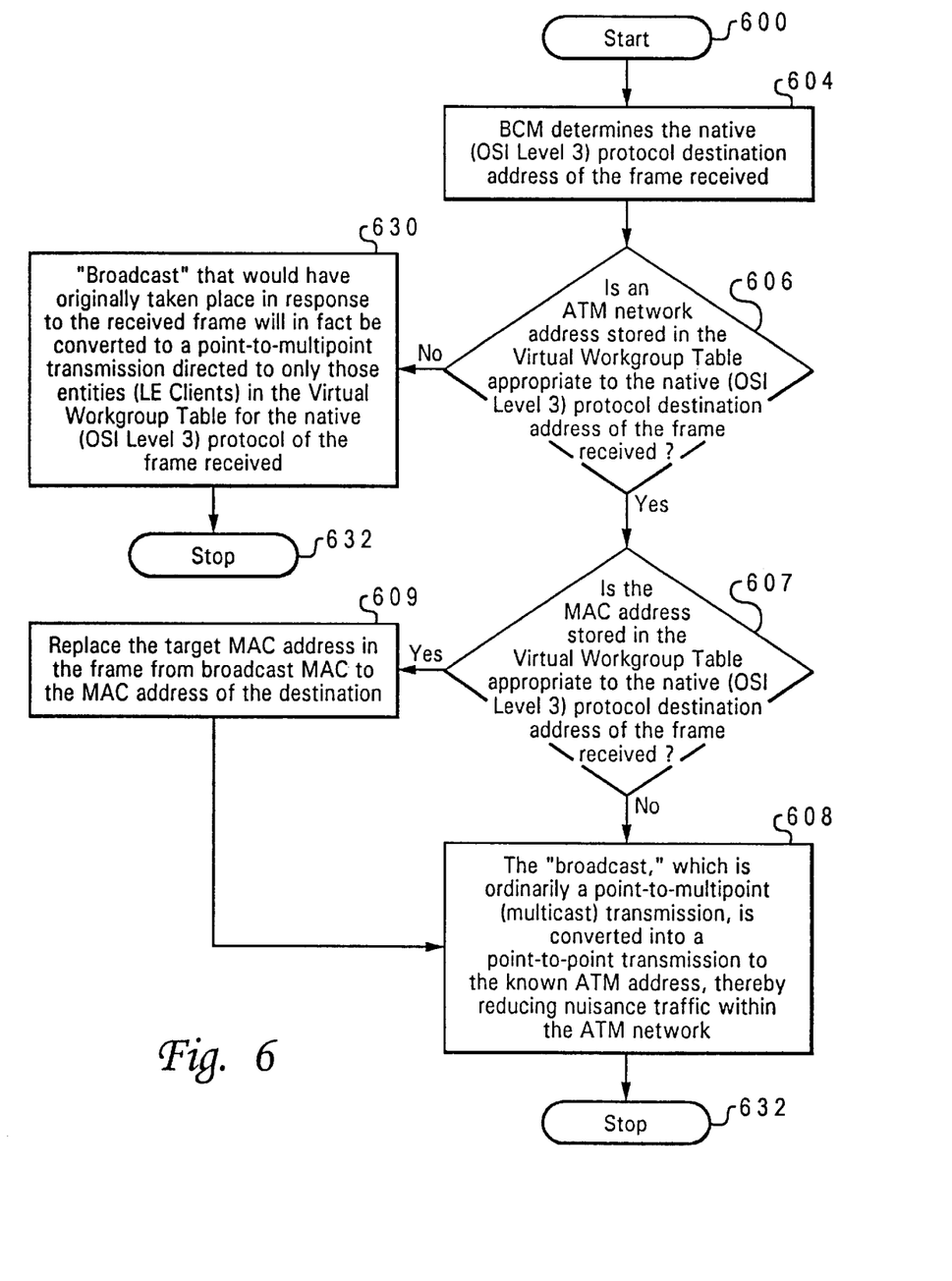
FIG. 6 illustrates one embodiment in which such Virtual Workgroup Tables are utilized to achieve increased bandwidth efficiency.
Figure 7:
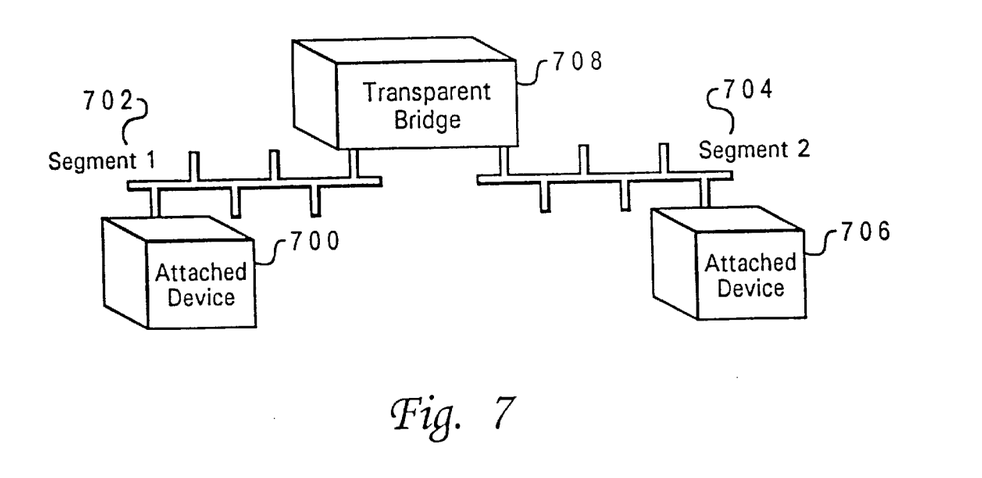
FIG. 7 illustrates an alternate embodiment in which such Virtual Workgroup Tables are utilized to achieve increased bandwidth efficiency.
Figure 8:
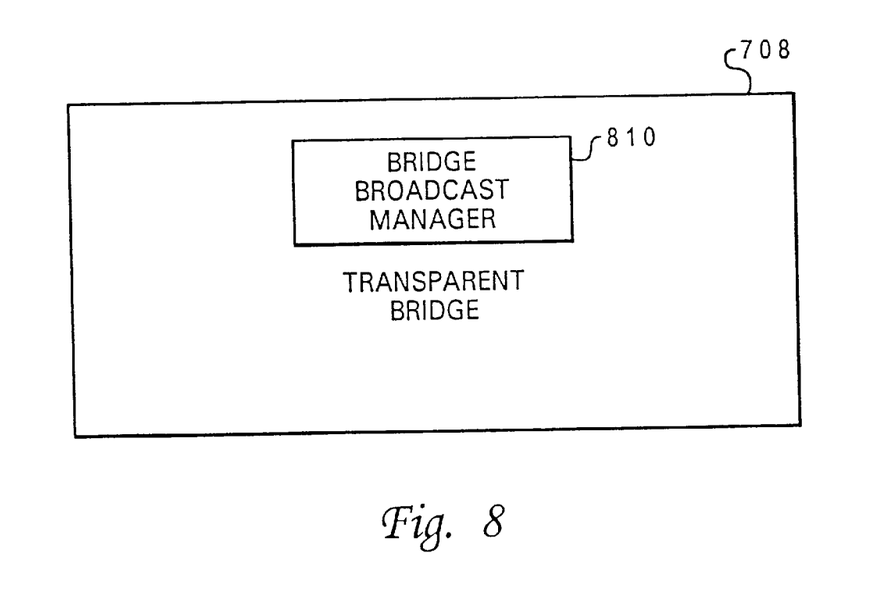
FIG. 8 demonstrates how one embodiment of the present invention reduces the network loading caused by retransmissions.
Figure 9:
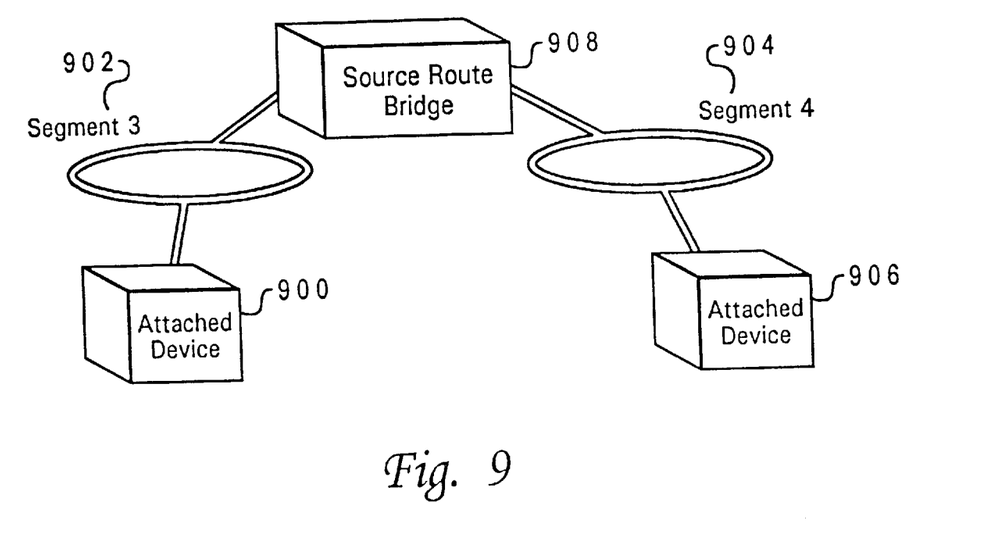
FIG. 9 depicts a source route bridge environment wherein an embodiment of the present invention may be practiced.
Figure 10:
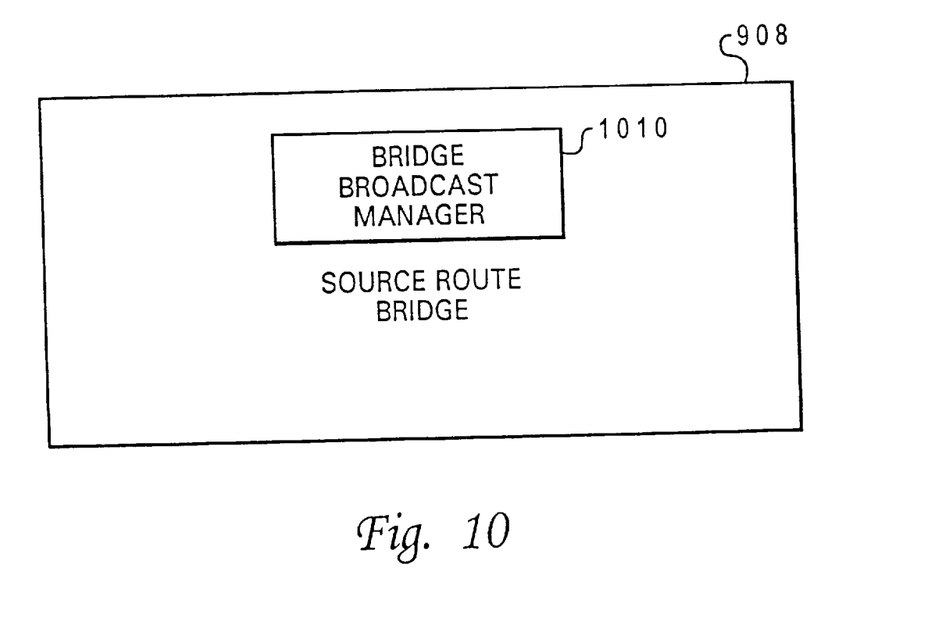
FIG. 10 demonstrates how one embodiment of the present invention reduces the network loading caused by retransmissions.

In one embodiment of the present invention, the "lists" are referred to as "Virtual Workgroup Tables." FIG. 5 depicts how such Virtual Workgroup Tables are created and maintained. FIG. 6 and FIG. 7 illustrate two embodiments in which such Virtual Workgroup Tables are utilized to achieve increased bandwidth efficiency. FIGS. 8, 9 and 10 show yet another embodiment of the present invention implemented in the environment of a transparent or source route bridge.

Refer now to FIG. 5. FIG. 5 depicts a high-level logic flow chart illustrating the creation of Virtual Workgroup Tables which is one component of the methods whereby broadcast manager (BCM) 410 reduces the number of broadcast frames transmitted to disinterested parties.

Method step 500 illustrates the start of the process. Method step 502 shows the detection of some entity requesting services from LAN Emulation Server/Broadcast and Unknown Server 210 (e.g., the receipt of a frame requiring "broadcast"). Method step 504 depicts the operation whereby BCM 410 determines the MAC Address, LE Client ATM address, and the native (OSI Level 3) protocol address of the source of the frame received.

Method step 505 shows the determination of whether the native (OSI Level 3) protocol in the frame received is a supported protocol. If the native (OSI Level 3) protocol is not supported, method step 507 depicts that the frame is sent as a normal broadcast frame. Thereafter, the process proceeds to method step 509 and stops.

Method step 506 illustrates the determination of whether or not a Virtual Workgroup Table exists for the native (OSI Level 3) protocol in the frame received from the source. In the event that a Virtual Workgroup Table does not exist for the native (OSI Level 3) protocol, shown in method step 508 is that a Virtual Workgroup Table is created for the native (OSI Level 3) protocol. Thereafter, method step 510 depicts the entry into the created Virtual Workgroup Table of a MAC Address-LE Client-native (OSI Level 3) protocol address grouping corresponding to the source of the frame received. Thereafter, the process proceeds to method step 516 which depicts that the process proceeds to the process depicted in FIG. 6.

In the event that a Virtual Workgroup Table does exist for the native (OSI Level 3) protocol, shown in method step 512 is that an inquiry is made as to whether or not an entry in the Virtual Workgroup Table exists for the MAC Address-LE Client-native (OSI Level 3) protocol address grouping corresponding to the source of the frame received.

In the event that a MAC Address-LE Client-native (OSI Level 3) protocol address grouping corresponding to the source of the frame received does exist in the Virtual Workgroup Table, the process proceeds to method step 516 which depicts that the process proceeds to the process depicted in FIG. 6. However, in the event that a MAC Address-LE Client-native (OSI Level 3) protocol address entry does not exist, shown in method step 514 is the entry into the table of the MAC Address-LE Client-native (OSI Level 3) protocol address grouping corresponding to the source of the frame received. Thereafter, the process proceeds to method step 516 which depicts that the process proceeds to the process depicted in FIG. 6.

Refer now to FIG. 6. FIG. 6 is a high-level logic flow chart that illustrates how in one embodiment of the present invention BCM 410 utilizes one or more Virtual Workgroup Tables to ensure that, when the Virtual Workgroup Table contains the precise address appropriate to a native (OSI Level 3) protocol destination address, what would ordinarily be handled, under standard ELAN protocol, as a "broadcast" will instead result in only broadcast to the specific LE Client appropriate to the native (OSI Level 3) protocol address of the destination desired by the entity requesting services from LAN Emulation Server/Broadcast and Unknown Server 210, or if such specific destination is not known, that the broadcast will only go to those stations indicated in the Virtual Workgroup Table.

Method step 600 depicts the start of the process. Method step 604 illustrates that BCM 410 examines the native (OSI Level 3) protocol address of the frame received.

Method step 606 shows the determination of whether an ATM network address is stored in the Virtual Workgroup Table appropriate to the native (OSI Level 3) protocol destination address. If an ATM network address is stored in the Virtual Workgroup Table appropriate to the native (OSI Level 3) protocol destination address, method step 607 determines if the MAC address stored in the Virtual Workgroup Table is appropriate to the native (OSI Level 3) protocol destination address of the frame received. If the MAC address stored in the Virtual Workgroup Table is appropriate to the native (OSI Level 3) protocol destination address of the frame received, method step 609 shows that the target MAC (i.e., the broadcast MAC) in the frame is replaced with the MAC address appropriate to the native (OSI Level 3) destination address. Thereafter, the process proceeds to method step 608.

If the MAC address stored in the Virtual Workgroup Table is not appropriate to the native (OSI Level 3) protocol destination address of the frame received, the process proceeds to method step 608.

Method step 608 depicts that, in the event that such an ATM address is known, the "broadcast," which is ordinarily a point-to-multipoint (multicast) transmission, is converted into a point-to-point transmission to the ATM network/LE Client address which is known to correspond to the native (OSI Level 3) protocol address in the address resolution request, thereby reducing nuisance traffic within the ATM network. Thereafter, the process proceeds to method step 632 which depicts end of the process.

If there is no ATM network address stored in the Virtual Workgroup Table appropriate to the native (OSI Level 3) protocol destination address, Method step 630 illustrates that the "broadcast" that would have originally taken place in response to the requesting entity's request for services will in fact be converted to a point-to-multipoint transmission directed to only those entities (LE Clients) in the Virtual Workgroup Table. Thereafter, the process proceeds to method step 632 and stops.

FIGS. 5, and 6 describe embodiment of the present invention in the context of an ATM protocol network ELAN. However, it is to be understood that the present invention is not restricted to an ATM protocol network ELAN, but can in fact be embodied in any environment wherein a second type of protocol network layer is being emulated/provided by first type of protocol network wherein the emulated layer is not normally present.

In addition, an embodiment of the present invention can be used with transparent bridge environments and source route bridge environments, as described below. Furthermore, it will be understood by those skilled in the art that the transparent bridge environments and source route bridge environments are merely examplary and that the present invention can also be applied to other bridged environments.

Refer now to FIG. 7. FIG. 7 depicts a transparent bridge environment wherein an embodiment of the present invention may be practiced. Shown are a first Ethernet LAN segment 702 and a second Ethernet LAN segment 704.

In FIG. 7, first Ethernet LAN segment 702 has Ethernet LAN attached device 700, which for sake of example is assumed to be running TCP/IP. Second Ethernet LAN segment 704 has Ethernet LAN attached device 706, which for sake of example is assumed to be running TCP/IP.

Assume that Ethernet LAN attached device 700 attempts to communicate with Ethernet LAN attached device 706, and passes the message addressed to the IP address of Ethernet LAN attached device 706 to the service layer of Ethernet LAN segment 702. The service layer realizes that the IP address of Ethernet LAN attached device 706 is not known to it (the service layer). Consequently, Ethernet LAN attached device 700 builds an IP Address Resolution Protocol (ARP) request with the destination IP address and with a "broadcast" header (basically, a header that tells every station that hears it to interrupt processing and pass the frame up to such station's attached devices) and then transmits the frame onto Ethernet LAN segment 702.

But for one embodiment of the present invention, in ordinary operation, when transparent bridge 708 receives the broadcast frame, it then retransmits it onto Ethernet LAN segment 704. The effect of the broadcast frame is again to interrupt all stations on Ethernet LAN segment 704 and cause them to pass the broadcast message up to the devices attached to the LAN to determine if any one of those attached devices corresponds to the IP address of LAN attached device 706. Thereafter, Ethernet LAN attached device 706 will cause answer back directly to the MAC address of the station Ethernet LAN attached device 700. Subsequently, communication can occur utilizing the known MAC addresses.

Those skilled in the art will appreciate that although only one additional Ethernet LAN segment 704 is shown, in practice several other Ethernet LAN segments may be attached to transparent bridge 708. Thus, but for one embodiment of the present invention, each broadcast frame received will result in retransmission of the broadcast frame over each of those several Ethernet LAN segments.

One embodiment avoids this retransmission over several segments, and the interruption in processing of the Ethernet LAN stations caused by the broadcast frames, by having the transparent bridge "learn" the higher layer protocol addresses of the devices attached to the Ethernet LAN station MAC addresses on each attached Ethernet LAN segment. FIG. 8 demonstrates how one embodiment of the present invention reduces the network loading caused by such retransmissions.

Refer now to FIG. 8. Shown in FIG. 8 is transparent bridge 708 wherein appears bridge broadcast manager (BBCM) 810. BBCM 810 monitors all frames which transit transparent bridge 708. When a frame transits transparent bridge 708, BBCM 810 reads and stores both the MAC address and the higher layer protocol address of the attached device which is the source of the frame. Thereafter, when a broadcast frame is received by transparent bridge 708, BBCM 810 reads the higher layer protocol address of the destination address which is the destination of the frame and (assuming that BBCM 810 supports, or stores, addresses for the higher layer protocol of the frame) checks its store for that destination address. If BBCM 810 has the higher level protocol destination address in its store, then it retrieves the known MAC address correspondent to that higher layer protocol destination address, and replaces the target MAC address (i.e. the broadcast MAC) with the MAC address appropriate to the higher layer protocol address. Transparent bridge 708 will then send this frame to Ethernet LAN segment 704. Consequently, with the MAC destination address resolved, transparent bridge 708 does not retransmit the broadcast frame to other segments and thus the network loading associated with that retransmission is avoided. Furthermore, end-stations other than Ethernet LAN attached device 706 on Ethernet LAN segment 704 are not interrupted by the frame.

Another embodiment of the present invention can be achieved with token-rings, which use source route bridges.

Refer now to FIG. 9. FIG. 9 depicts a source route bridge environment wherein an embodiment of the present invention may be practiced. Shown are first token-ring LAN segment 902 and second token-ring LAN segment 904.

In FIG. 9, first token-ring LAN segment 902 has token-ring LAN attached device 900, which for sake of example is assumed to be running TCP/IP. Second token-ring LAN segment 904 has token-ring LAN attached device 906, which for sake of example is assumed to be running TCP/IP.

Assume that token-ring LAN attached device 900 attempts to communicate with token-ring LAN attached device 906, and passes the message addressed to the IP address of token-ring LAN attached device 906 to the service layer of token-ring LAN segment 902. The service layer realizes that the IP address of token-ring LAN attached device 906 is not known to it (the service layer). Consequently, 900 builds an IP Address Resolution Protocol (ARP) request with the destination IP address and with a broadcast header and marked as explorer (basically, a header that tells every station that hears it to interrupt processing and pass the frame up to such station's attached devices and is used to build a "routing information field," which records the path of the explorer frames through the source route bridges in the network until it arrives at its destination) and then transmits the frame onto token-ring LAN segment 902.

But for one embodiment of the present invention, in ordinary operation, when source route bridge 908 receives the explorer frame, source route bridge 908 adds its bridge # and the next ring # to the frame before forwarding it to the next ring; it then retransmits the enlarged explorer frame onto token-ring LAN segment 904. The effect of the broadcast explorer frame is again to interrupt all stations on the LAN and cause them to pass the encapsulated message up to the devices attached to the LAN to determine if any one of those attached devices corresponds to the IP address of token-ring LAN attached device 906. Thereafter, token-ring LAN attached device 906 causes answer back to token-ring LAN attached device 900. Subsequently, communication can occur utilizing the known Routing Information Field and the known MAC addresses.

Those skilled in the art will appreciate that although only one additional token-ring LAN segment 904 is shown, in practice several other token-ring LAN segments may be attached to source route bridge 908. Thus, but for one embodiment of the present invention each broadcast frame received would result in retransmission of the broadcast frame over each of those several token-ring LAN segments.

One embodiment avoids this retransmission over several segments, and the interruption in processing of the token-ring LAN stations caused by the broadcast frames, by having the source route bridge "learn" the higher layer protocol addresses and corresponding MAC addresses of the devices attached on each attached token-ring LAN segment. FIG. 10 demonstrates how one embodiment of the present invention reduces the network loading caused by such retransmissions.

Refer now to FIG. 10. Shown in FIG. 10 is source route bridge 908 wherein resides bridge broadcast manager (BBCM) 1010. BBCM 1010 monitors all frames which transit source route bridge 908. When a frame transits source route bridge 908, BBCM 1010 reads and stores both the MAC address and the higher layer protocol address of the attached device which is source of the frame. Thereafter, when an explorer broadcast frame is received by source route bridge 908, BBCM 1010 reads the higher layer protocol address of the destination address which is the destination of the frame and (assuming that BBCM 1010 supports, or stores, addresses for the higher layer protocol of the frame) checks its store for that destination address. If BBCM 1010 has the higher level protocol destination address in its store, then it retrieves the known MAC address correspondent to that higher layer protocol destination address, and replaces the target MAC address (i.e. the broadcast MAC) with the MAC address appropriate to the higher layer protocol address. Source route bridge 908 will then forward this frame to LAN segment 904. Consequently, end-stations other than LAN attached device 906 on LAN segment 904 are not interrupted by the frame.

Figure 11:
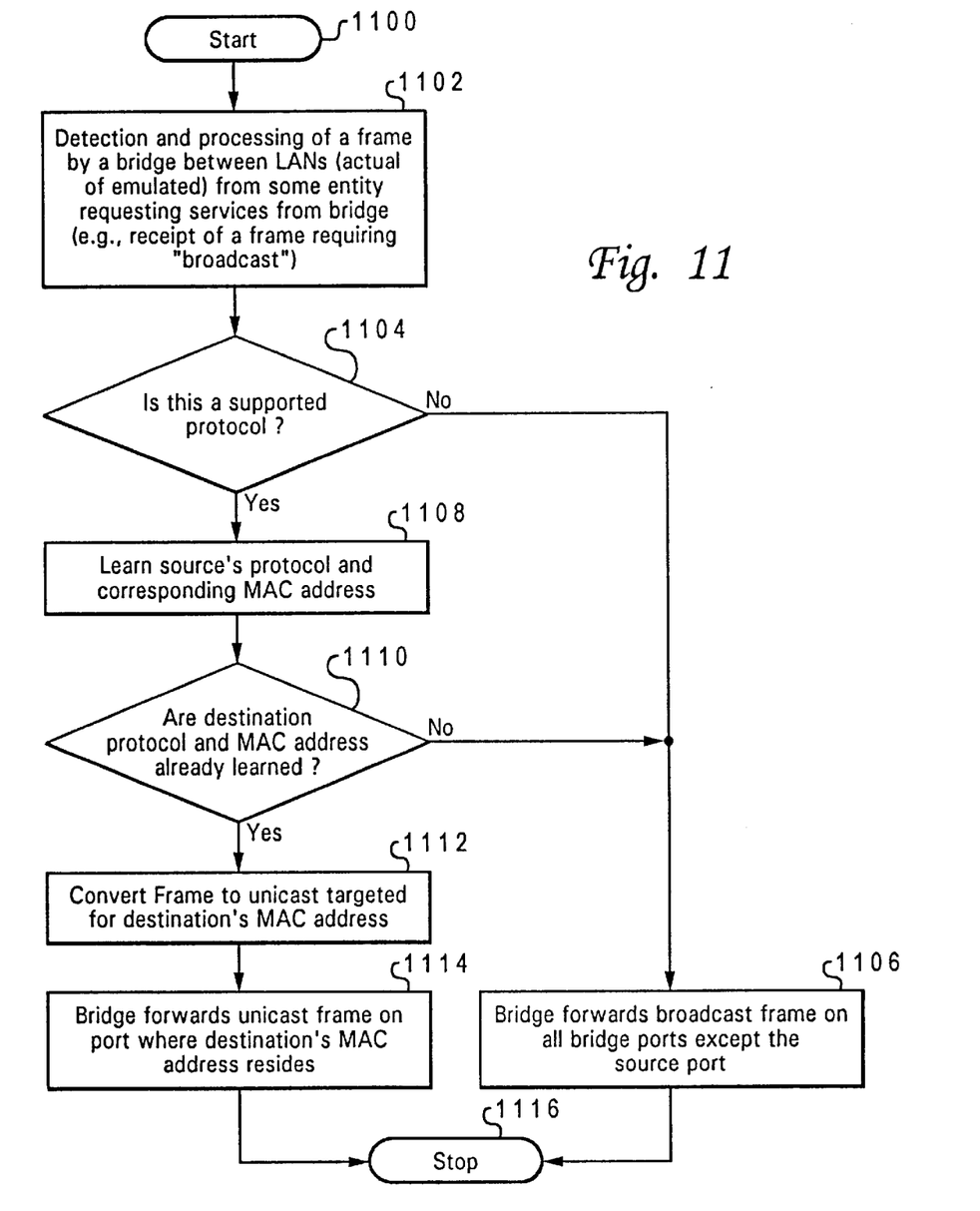
FIG. 11 illustrates a high-level logic flow chart of the process by which one embodiment of the present invention builds an Inter-LAN Virtual Workgroup Tables in either transparent bridge or source route bridge environments

Refer now to FIG. 11. FIG. 11 illustrates a highlevel logic flow chart of the process by which one embodiment of the present invention builds an Inter-LAN Virtual Workgroup Tables in either transparent bridge or source route bridge environments. Method step 1100 shows the start of the process. Method step 1102 depicts the receipt by a bridge (either a source route bridge or a transparent bridge) of a broadcast frame. Method step 1104 illustrates the examination of the native (OSI Level 3) protocol address of the source of the broadcast frame by a bridge broadcast manager resident within the bridge. In the event that the native protocol is not supported by the bridge broadcast manager, the process proceeds to method step 1106 which shows that the bridge forwards broadcast frame on all bridge ports. Thereafter the process proceeds to method step 1116 and stops.

In the event that the native protocol is supported by the broadcast manager, the process proceeds to method step 1108 which shows that the broadcast manager learns the source's OSI Level 3 protocol address and corresponding OSI Level 2 MAC address (the learning takes place in a manner analogous to that shown in FIG. 5). Method step 1110 depicts the determination of the OSI Level 3 destination address of the broadcast frame and the subsequent determination of whether a MAC address for that OSI Level 3 address is known.

In the event that a MAC destination is known for the OSI Level 3 protocol address, method step 1112 illustrates that the broadcast frame is converted to a unicast frame targeted for the known MAC address correspondent to the determined OSI Level 3 destination address of the received broadcast frame. Thereafter, method step 1114 shows that the bridge forwards the unicast frame on port where destinations's MAC address resides. Thereafter the process proceeds to method step 1116 and stops.

In the event that a MAC destination is not known for the OSI Level 3 protocol address, the process proceeds to method step 1106 which shows that the bridge forwards broadcast frame on all bridge ports except the source port. Thereafter the process proceeds to method step 1116 and stops.

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. A method for reducing broadcasts within a collaborative data processing environment, said method comprising:
    receiving a first data frame that includes a source indicator;
    in response to receiving said first data frame, recording said source indicator in a table;
    thereafter, receiving a second data frame with at least first and second destination indicators, wherein said first destination indicator requests broadcast of said second data frame and said second destination indicator corresponds to at least one target station;
    in response to receiving said second data frame, determining whether said table includes said second destination indicator; and
    in response to determining that said table includes said second destination indicator, transmitting said second data frame to said target station in lieu of broadcasting said second data frame.

2. The method of claim 1, wherein said step of recording said source indicator comprises recording a media access control address of an entity from which said first data frame originated.

3. The method of claim 2, wherein said step of recording said source indicator comprises recording an asynchronous transfer mode protocol address of said entity from which said first data frame originated.

4. The method of claim 1, wherein said step of recording said source indicator comprises associating said source indicator with a protocol indicator in said table, according to a native protocol of an entity from which said first data frame originated.

5. The method of claim 4, wherein:
    said method further comprises identifying a native protocol of an entity from which said second data frame originated;
    said step of determining whether said table includes said second destination indicator comprises determining whether said table associates said native protocol with one or more stored source indicators; and
    said step of transmitting said second data frame to said target station comprises, in response to a determination that said native protocol is associated with one or more stored source indicators, transmitting said second data frame to one or more entities corresponding to said one or more stored source indicators.

6. The method of claim 2, wherein said step of transmitting said second data frame to said target station comprises utilizing said media access control address associated with said target station in said table to transmit said second data frame to said target station.

7. The method of claim 3, wherein said step of transmitting said second data frame to said target station comprises utilizing said asynchronous transfer mode protocol address associated with said target station in said table to transmit said second data frame to said target station.

8. The method of claim 6, wherein:
    said collaborative data processing environment includes a local area network (LAN) emulation server in communication with at least first and second LAN emulation clients;
    said first and second data frames are received at said LAN emulation server from said first and second LAN emulation clients, respectively; and said step of utilizing said media access control address to transmit said second data frame to said target station comprises transmitting said second data frame from said LAN emulation server only to said first LAN emulation client.

9. The method of claim 5, wherein:
said collaborative data processing environment includes a local area network (LAN) emulation server in communication with at least first and second LAN emulation clients; and
said step of transmitting said second data frame to said one or more entities comprises transmitting said second data frame at least to said first LAN emulation client, in response to reception of said first data frame from said first LAN emulation client and said second data frame from said second LAN emulation client.

10. A system for reducing broadcasts in a collaborative data processing environment, said system comprising:
means for receiving first and second data frames, said first data frame having a source indicator and said second data frame having at least first and second destination indicators, wherein said first destination indicator requests broadcast of said second data frame and said second destination indicator corresponds to at least one target station;
means, responsive to reception of said first data frame, for recording said source indicator in a table;
means, responsive to reception of said second data frame for determining whether said table includes said second destination indicator; and
means, responsive to a determination that said table includes said second destination indicator, for transmitting said second data frame to said target station in lieu of broadcasting said second data frame.

11. The system of claim 10, wherein said means for recording said source indicator comprises means for recording a media access control address of an entity from which said first data frame originated.

12. The system of claim 11, wherein said means for recording said source indicator comprises means for recording an asynchronous transfer mode protocol address of said entity from which said first data frame originated.

13. The system of claim 10, wherein said means for recording said source indicator comprises means for associating said source indicator with a protocol indicator in said table, according to a native protocol of an entity from which said first data frame originated.

14. The system of claim 13, wherein:
said system further comprises means for identifying a native protocol of an entity from which said second data frame originated;
said means for determining whether said table includes said second destination indicator comprises means for determining whether said table associates said native protocol with one or more stored source indicators; and
said means for transmitting said second data frame to said target station comprises means, responsive to a determination that said native protocol is associated with one or more stored source indicators, for transmitting said second data frame to one or more entities corresponding to said one or more stored source indicators.

15. The system of claim 11, wherein said means for transmitting said second data frame to said target station comprises means for utilizing said media access control address associated with said target station in said table to transmit said second data frame to said target station.

16. The system of claim 12, wherein said means for transmitting said second data frame to said target station comprises means for utilizing said asynchronous transfer mode protocol address associated with said target station in said table to transmit said second data frame to said target station.

17. The system of claim 15, wherein:
said system comprises a local area network (LAN) emulation server in communication with at least first and second LAN emulation clients, said LAN emulation server including said means for receiving said first and second date frames;
said first and second data frames are received from said first and second LAN emulation clients, respectively; and
said means for utilizing said media access control address to transmit said second data frame to said target station comprises means for transmitting said second data frame from said LAN emulation server only to said first LAN emulation client.

18. The system of claim 14, wherein:
said system comprises a local area network (LAN) emulation server in communication with at least first and second LAN emulation clients, said LAN emulation server including said means for receiving said first and second date frames; and
said means for transmitting said second data frame to said one or more entities comprises means, responsive to reception of said first data frame from said first LAN emulation client and said second data frame from said second LAN emulation client, for transmitting said second data frame at least to said first LAN emulation client.

19. A program product for reducing broadcasts in a collaborative data processing environment, said program product comprising a computer usable medium encoding:
means for receiving first and second data frames, said first data frame having a source indicator and said second data frame having at least first and second destination indicators, wherein said first destination indicator requests broadcast of said second data frame and said second destination indicator corresponds to at least one target station;
means, responsive to reception of said first data frame, for recording said source indicator in a table;
means, responsive to reception of said second data frame for determining whether said table includes said second destination indicator; and
means, responsive to a determination that said table includes said second destination indicator, for transmitting said second data frame to said target station in lieu of broadcasting said second data frame.

20. The program product of claim 19, wherein said means for recording said source indicator comprises means for recording a media access control address of an entity from which said first data frame originated.

21. The program product of claim 20, wherein said means for recording said source indicator comprises means for recording an asynchronous transfer mode protocol address of said entity from which said first data frame originated.

22. The program product of claim 21, wherein said means for transmitting said second data frame to said target station comprises means for utilizing said asynchronous transfer mode protocol address associated with said target station in said table to transmit said second data frame to said target station.

23. The program product of claim 20, wherein said means for transmitting said second data frame to said target station comprises means for utilizing said media access control address associated with said target station in said table to transmit said second data frame to said target station.

24. The program product of claim 23, wherein:

said program product is adapted to execute on a local area network (LAN) emulation server in communication with at least first and second LAN emulation clients; and said means for utilizing said media access control address to transmit said second data frame to said target station comprises means, responsive to reception of said first data frame from said first LAN emulation a client and said second data frame from said second LAN emulation client, for transmitting said second data frame from said LAN emulation server only to said first LAN emulation client.

25. The program product of claim 19, wherein said means for recording said source indicator comprises means for associating said source indicator with a protocol indicator in said table, according to a native protocol of an entity from which said first data frame originated.

26. The program product of claim 25, wherein:

said computer usable medium further encodes means for identifying a native protocol of an entity from which said second data frame originated;

said means for determining whether said table includes said second destination indicator comprises means for determining whether said table associates said native protocol with one or more stored source indicators; and said means for transmitting said second data frame to said target station comprises means, responsive to a determination that said native protocol is associated with one or more stored source indicators, for transmitting said second data frame to one or more entities corresponding to said one or more stored source indicators.

27. The program product of claim 26, wherein:

said program product is adapted to execute on a local area network (LAN) emulation server in communication with at least first and second LAN emulation clients; and said means for transmitting said second data frame to said one or more entities comprises means, responsive to reception of said first data frame from said first LAN emulation client and said second data frame from said second LAN emulation client, for transmitting said second data frame at least to said first LAN emulation client.

* * * * *